United States Patent
Hulvey

(10) Patent No.: US 8,902,877 B2
(45) Date of Patent: Dec. 2, 2014

(54) METHOD AND SYSTEM FOR REDUCING POWER CONSUMPTION IN WIRELESS COMMUNICATIONS BY ADJUSTING COMMUNICATION INTERVALS

(75) Inventor: Robert William Hulvey, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 226 days.

(21) Appl. No.: 13/243,787

(22) Filed: Sep. 23, 2011

(65) Prior Publication Data

US 2013/0054990 A1 Feb. 28, 2013

Related U.S. Application Data

(60) Provisional application No. 61/526,125, filed on Aug. 22, 2011.

(51) Int. Cl.
*H04W 52/00* (2009.01)
*G06F 1/32* (2006.01)
*H04W 52/02* (2009.01)

(52) U.S. Cl.
CPC ......... *G06F 1/3278* (2013.01); *H04W 52/0216* (2013.01); *Y02B 60/126* (2013.01); *Y02B 60/50* (2013.01)
USPC .......................................................... 370/350

(58) Field of Classification Search
USPC .......................................... 370/350; 710/2, 8
See application file for complete search history.

(56) References Cited

U.S. PATENT DOCUMENTS

| | | | | |
|---|---|---|---|---|
| 5,953,311 A * | 9/1999 | Davies et al. | .................. | 370/210 |
| 6,470,057 B1 * | 10/2002 | Hui et al. | ........................ | 375/294 |
| 7,126,937 B2 * | 10/2006 | Crosbie et al. | ................ | 370/350 |
| 7,974,261 B2 * | 7/2011 | Lane et al. | ..................... | 370/350 |
| 7,983,702 B2 * | 7/2011 | Li et al. | .......................... | 455/502 |
| 8,031,693 B2 * | 10/2011 | Jia et al. | ......................... | 370/350 |
| 8,036,205 B2 * | 10/2011 | Lane et al. | ..................... | 370/350 |
| 8,040,839 B2 * | 10/2011 | Kakumaru et al. | ........... | 370/328 |
| 8,077,696 B2 * | 12/2011 | Izumi et al. | .................... | 370/350 |
| 8,086,249 B1 * | 12/2011 | Dinan et al. | ................ | 455/456.1 |
| 8,213,406 B2 * | 7/2012 | Luz et al. | ....................... | 370/350 |
| 8,380,240 B2 * | 2/2013 | Muharemovic et al. | ...... | 455/524 |
| 8,391,272 B2 * | 3/2013 | Cai et al. | ....................... | 370/350 |
| 8,452,240 B2 * | 5/2013 | Takahashi | ....................... | 455/75 |
| 8,503,404 B2 * | 8/2013 | Kim et al. | ..................... | 370/335 |
| 8,520,704 B2 * | 8/2013 | Li et al. | .......................... | 370/496 |

(Continued)

OTHER PUBLICATIONS

3GPP LTE for TDD Spectrum in the Americas, 3G americas, Nov. 2009.*

(Continued)

*Primary Examiner* — Mark Rinehart
*Assistant Examiner* — Peter Solinsky
(74) *Attorney, Agent, or Firm* — Oblon, Spivak, McClelland, Maier & Neustadt, L.L.P.

(57) ABSTRACT

According to one disclosed embodiment, a method for reducing power consumption in wireless communications is described. This method may include transmitting a data transmission from a peripheral device to a primary device during a receiving interval of the primary device, receiving a correction offset by the peripheral device from the primary device after the transmitting of the data transmission, and transmitting a subsequent data transmission from the peripheral device to the primary device using the correction offset to ensure that the subsequent data transmission by the peripheral device occurs within a subsequent receiving interval of the primary device.

17 Claims, 3 Drawing Sheets

(56) References Cited

U.S. PATENT DOCUMENTS

| | | | |
|---|---|---|---|
| 2004/0264466 A1* | 12/2004 | Huang | 370/392 |
| 2007/0171889 A1* | 7/2007 | Kwon et al. | 370/350 |
| 2008/0120081 A1* | 5/2008 | Chandrashekar et al. | 703/13 |
| 2008/0200772 A1* | 8/2008 | Shimizu | 600/300 |
| 2009/0016320 A1* | 1/2009 | Li et al. | 370/350 |
| 2009/0135802 A1* | 5/2009 | Haga et al. | 370/350 |
| 2011/0176535 A1* | 7/2011 | Lipka et al. | 370/350 |
| 2011/0243011 A1* | 10/2011 | Togashi et al. | 370/252 |
| 2012/0120944 A1* | 5/2012 | Yang et al. | 370/350 |
| 2012/0188997 A1* | 7/2012 | Zakrzewski et al. | 370/350 |
| 2012/0294392 A1* | 11/2012 | Zhang | 375/340 |
| 2012/0300751 A1* | 11/2012 | Arai et al. | 370/336 |
| 2012/0314591 A1* | 12/2012 | Zhang et al. | 370/252 |
| 2013/0051407 A1* | 2/2013 | Fourcand | 370/514 |

OTHER PUBLICATIONS

ETSI TS 36.211, ver. 10.0.0, Jan. 2011, Sections 5.2 and 5.5.*
ETSI TS 36.321, ver. 10.0.0, Jan. 2011, Section 5.2.*
Synchronization Techniques for Orthogonal Frequency Division Multiple Access (OFDMA): A Tutorial Review, Morelli, Morelli, Kuo, Jay, Pun, Man-On, Proceedings of the IEEE, vol. 95, No. 7, Jul. 2007, pp. 1394-1427.*
Robust Synchronization for 3GPP LTE System, Xu, Wen, Manolakis, Konstantinos, 978-1-4244-5638-3/10/$26.00 © 2010 IEEE.*

* cited by examiner

METHOD AND SYSTEM FOR REDUCING POWER CONSUMPTION IN WIRELESS COMMUNICATIONS BY ADJUSTING COMMUNICATION INTERVALS

RELATED APPLICATIONS

This application is based on and claims priority from U.S. Provisional Patent Application Ser. No. 61/526,125, filed Aug. 22, 2011, which is hereby incorporated by reference in its entirety.

BACKGROUND OF THE INVENTION

1. Field of the Invention

The present invention is generally in the field of electronic circuits and systems. More specifically, the present invention is in the field of communications circuits and systems.

2. Background Art

In the field of wireless communications, the challenge of managing the timing of communications between a peripheral device and a primary device has traditionally been addressed using one of two conventional approaches. In the first conventional approach, a peripheral device controls the timing of the communication, while in the second conventional approach a primary device controls the timing. All such systems generally must deal with "clock drift", where the clocks of the primary device and the peripheral device slowly move out of sync with one another. If both the primary device and peripheral device have a ±100 ppm crystal, for example, there can be a clock drift of up to ±200 ppm between the two devices. This means that a primary device, in combination with a peripheral device transmitting at a 1 second interval, would have to begin listening up to 200 µs before the time at which it expects the peripheral device to transmit.

According to the first conventional approach to controlling the timing of the primary and peripheral devices, the peripheral device transmits a signal to the primary device, and the primary device tracks the timing of the peripheral device's transmissions. This approach can be either one-way or two-way. In the case of a one-way communication, the peripheral device simply transmits and does not wait for a response. The primary device must typically begin "listening" a little earlier than when it expects the peripheral device to transmit in order to compensate for any possible clock drift. As a result, the primary device draws more power due to this additional "listening" period. In the case of a two-way communication, the primary device can acknowledge the receipt of the data. If the primary device does not receive the data, the peripheral device can keep trying. This improves robustness, but increases power consumption in both the primary and peripheral devices.

In a second approach, the primary device controls timing and the peripheral device wakes up to be polled by the primary device. With this approach, the burden of compensating for clock drift rests on the peripheral device, which must be prepared to listen early for a polling signal, due to clock drift. Since the peripheral device is often a small, battery-powered device, this is undesirable as the receive period must typically grow as the communication interval increases, hence negating some of the reduction to average power consumption achieved by lengthening the communication interval. Using more accurate crystals on the peripheral and primary devices can help, but increases system costs.

Thus, there is a need to overcome the drawbacks and deficiencies in the art by providing a solution which allows lower power consumption to be achieved in a peripheral device while allowing a primary device to more efficiently manage radio traffic with a plurality of devices, including the peripheral device.

SUMMARY OF THE INVENTION

The present invention is directed to a method and system for reducing power consumption in wireless communications, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
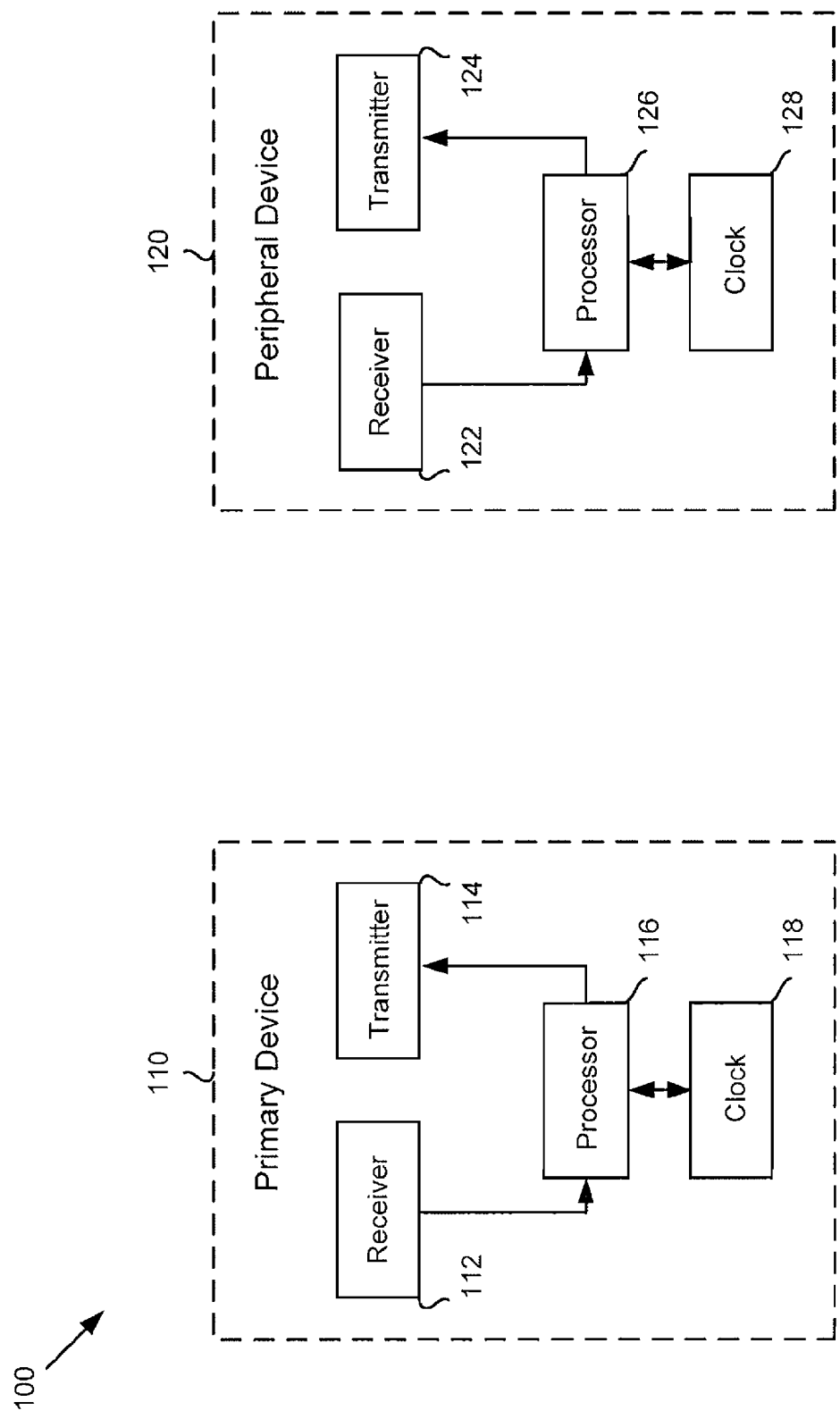
FIG. 1 shows a system diagram including a primary device and a peripheral device, used in connection with a method for reducing power consumption in wireless communications, according to one embodiment of the present invention.

The present invention is directed to a method and system for reducing power consumption in wireless communications. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Wireless communication systems generally must deal with "clock drift", wherein the clocks of two or more wireless devices slowly move out of sync with one another. This phenomenon is typically caused by inaccuracies in the clocks of each of the devices, relative to one another. For example, if both a peripheral device and primary device have a ±100 ppm crystal there can be a clock drift of up to ±200 ppm between the two devices. This means that a primary device in combination with a peripheral device transmitting at a 1 second interval would have to begin listening up to 200 µs before the time at which it expects the peripheral device to transmit in order to ensure that the entire data transmission from the peripheral device is received by the primary device. As explained above, conventional approaches to addressing clock drift undesirably result in additional power consumption by one or both of the primary device and peripheral device.

Another phenomenon which impacts the accuracy of the clocks of two or more wireless devices relative to one another is "clock jitter". Clock jitter is typically caused by random environmental influences such as thermal noise, flicker noise (a source of noise in semiconductor circuits) and electromagnetic noise. Similar to the way in which clock drift is handled, a primary device in combination with a peripheral device transmitting at a given interval would have to begin listening earlier than the expected time at which it expects the peripheral device to transmit. However, clock jitter generally does not vary with the duration of the transmission interval. Instead, how much earlier the primary device must begin listening to compensate for clock jitter is generally related to the statistical properties of the clock jitter.

Thus, a primary device must typically begin listening early enough relative to the time at which the peripheral device is expected to transmit to compensate for the effects of both clock drift and clock jitter. The invention described herein primarily compensates for the effects of clock drift, enabling the time to be minimized to just the time required to compensate for the clock jitter. Clock jitter is generally much smaller in magnitude than clock drift, particularly if a quartz crystal is used to provide the timing reference. In systems where high jitter is present, such as an integrated circuit using an on-chip relaxation oscillator, the benefit of the invention may be reduced.

FIG. 1 shows system 100 for reducing power consumption in wireless communications, according to one embodiment of the present invention, which is capable of overcoming the drawbacks and deficiencies identified with the conventional art. According to the embodiment of FIG. 1, system 100 is configured to include at least primary device 110, shown in FIG. 1 in combination with peripheral device 120. Primary device 110 may comprise receiver 112, transmitter 114, processor 116 and clock 118, and may be configured to initiate a receiving interval, receive a data transmission and determine a correction offset according to a receive timing of the data transmission, so as to enable a subsequent data transmission to occur within a subsequent receiving interval. Within primary device 110, receiver 112 may be connected to processor 116 and may be configured to receive data transmissions from one or more peripheral devices, for example, peripheral device 120. Transmitter 114 may also be connected to processor 116 and may be configured to transmit a response to one or more peripheral devices, for example, peripheral device 120. However, one of ordinary skill in the art would recognize that transmitter 114 could also be configured to transmit any type of data to a wide variety of electronic devices. Clock 118 may be connected to processor 116 and may enable primary device 110 to track timing intervals necessary to the operation of one or more embodiments of the present invention.

Peripheral device 120 may comprise, for example, transmitter 124, processor 126, clock 128 and receiver 122. Peripheral device 120 may be configured to transmit and receive data, according to one or more embodiments of the present invention. Peripheral device 120 may include receiver 122 configured to receive a transmitted response from primary device 110. Transmitter 124 may be connected to processor 126 and may be configured to periodically transmit data to primary device 110. However, one of ordinary skill in the art would recognize that transmitter 124 could also be configured to transmit any type of data to a wide variety of electronic devices. Clock 128 may be connected to processor 126 and may enable peripheral device 120 to track timing intervals necessary to the operation of one or more embodiments of the present invention. Finally, processor 126 may be configured to control transmission and reception of data as disclosed in one or more embodiments of the present application.

Figure 2:
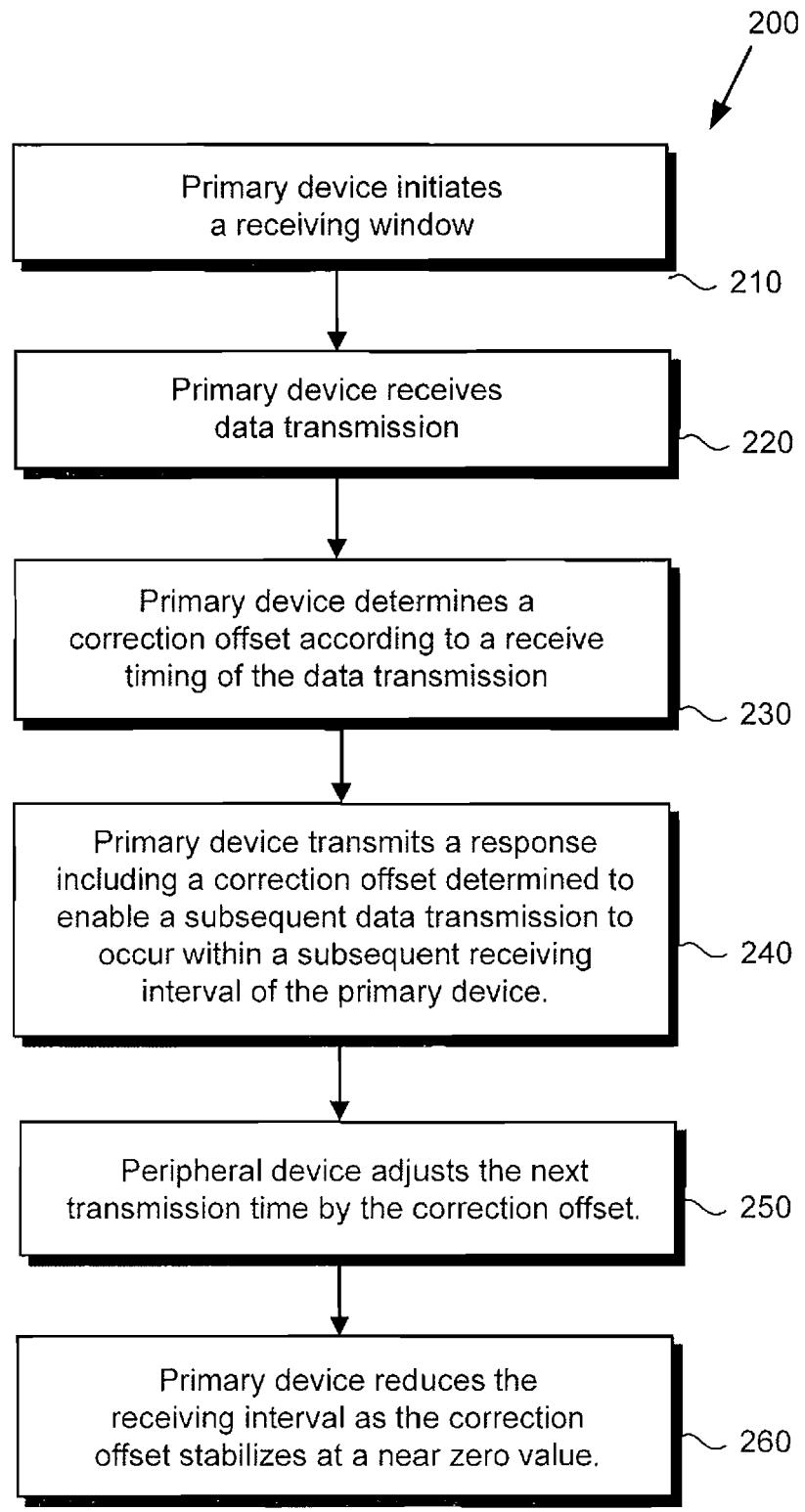
FIG. 2 shows a flowchart describing steps taken to implement a method for reducing power consumption in wireless communications, according to an embodiment of the present invention.
Figure 3:
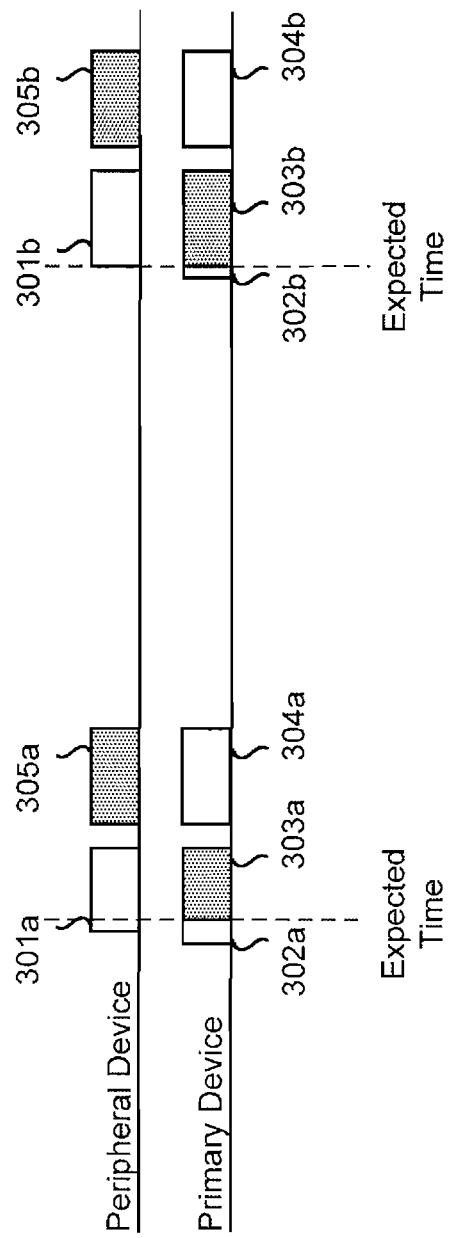
FIG. 3 shows a timing diagram denoting the operation of a system utilizing a method for reducing power consumption in wireless communications, according to an embodiment of the present invention.

The operation of system 100 will be further described by reference to FIGS. 2 and 3. FIG. 2 shows a flowchart presenting steps taken to implement a method for reducing power consumption in wireless communications, according to one embodiment of the present invention, while FIG. 3 shows a timing diagram denoting the operation of a system utilizing an embodiment of the present invention. With respect to FIG. 2, it is noted that certain details and features have been left out of flowchart 200 that are apparent to a person of ordinary skill in the art. For example, a step may comprise one or more substeps, as known in the art. While steps 210 through 260 indicated in flowchart 200 are sufficient to describe at least one embodiment of the present method, other embodiments may utilize steps different from those shown in flowchart 200, or may include more, or fewer steps.

As shown in FIG. 2, step 210 of flowchart 200 comprises a primary device initiating a receiving interval. Referring, for example, to FIG. 1, step 210 may be performed by primary device 110 in anticipation of a data transmission by peripheral device 120. The receiving interval is typically initiated earlier than a time when primary device 110 expects a transmission from peripheral device 120. How early the receiving interval is initiated may be dependent upon, for example, the accuracy of respective clocks 118 and 128 of primary device 110 and peripheral device 120, as well as the time between successive receiving intervals. The early receiving interval, initiated earlier than when primary device 110 expects a transmission, is denoted by interval 302a of FIG. 3.

Continuing with step 220 of FIG. 2, step 220 comprises the primary device receiving a data transmission from the peripheral device. According to the embodiment shown in FIG. 1, for example, step 220 may correspond to receipt, by primary device 110, of a data transmission from peripheral device 120. Such a transmission is depicted as interval 301a of FIG. 3. As can be seen in FIG. 3, the data transmission 301a occurs earlier than expected, for example. However, primary device 110 may still receive transmission 301a because the early receiving interval 302a is initiated at a time prior to the leading edge of transmission 301a . One of ordinary skill would understand that peripheral device 120 may also transmit at a time later than expected, due to clock shift in the other direction. Interval 303a shows the time interval, from the expected time of transmission, during which primary device 110 is receiving data transmission 301a . However, the intervals 302a and 303a , together, represent an interval during which primary device 110 can receive data transmission 301a.

Moving on to step 230 of FIG. 2, step 230 comprises the primary device determining a correction offset according to a receive timing of the data transmission. Step 230 may be performed by primary device 110, in FIG. 1, for example. The correction offset may be substantially equal to an interval between an expected receive time of the data transmission and the actual receive time of the data transmission by primary device 110, for example. This correction offset may be depicted as substantially equivalent to the portion of the interval 301a to the left of the left-most expected-time line in FIG. 3.

Continuing with step 240 of FIG. 2, step 240 comprises the primary device transmitting a response including a correction offset determined to enable a subsequent data transmission by the peripheral device to occur within a subsequent receiving interval of the primary device. During this step, which may be performed by primary device 110, for example, primary device 110 acknowledges receipt of the transmission by transmitting a response back to peripheral device 120, which according to the present embodiment is assumed to include receiver 122. The acknowledging response may include a number representing the correction offset. The transmission of this acknowledging response is depicted by interval 304a in FIG. 3. The receipt of the acknowledging response by peripheral device 120 is depicted by interval 305a of FIG. 3.

Additionally, step 250 of FIG. 2 comprises the peripheral device 120 adjusting the next transmission time by the correction offset. However, in the alternative, peripheral device 120 may adjust the timing of its next transmission according to an average or other function of multiple past correction offsets, for example. Thus, in systems in which random clock jitter is much smaller than the clock drift the correction offset should tend toward zero over time. As can be seen in FIG. 3, a next transmission 301b by peripheral device 120 may occur at substantially the same time as expected by primary device 110.

Step 260 of FIG. 2 comprises the primary device reducing the receiving interval as the correction offset stabilizes at a near zero value. For example, primary device 110 may detect that the corrective offset has stabilized at a very low value and reduce how early primary device 110 begins early receiving interval 302b during a subsequent cycle. Thus, in FIG. 3 early receiving interval 302b is shown having a shorter duration than the previous early receiving interval 302a . Primary device 110 may then receive a second data transmission 301b from the peripheral device, the receipt taking place, by the primary device, in intervals 302b and 303b . Primary device 110 then transmits response 304b including a new correction offset which is received by peripheral device 120 during interval 305b , and the cycle repeats. In addition, once the corrective offset has been nearly zeroed out, the timing of a subsequent data transmission by peripheral device 120 may be further adjusted, or moved, to allow primary device 110 to handle other traffic from other devices, such as one or more additional peripheral devices, for example.

The present invention may be especially beneficial to slotted communication systems, for example, where the primary device may be communicating with a plurality of devices, which may be peripheral devices or other devices. In a BLUETOOTH BR/EDR or BLUETOOTH Low Energy application, for example, the present invention could allow a primary device to more accurately control the timing of a plurality of peripheral devices such that the communications of the peripheral devices do not overlap in time or interfere with one another. For instance, communications with a peripheral device may be constrained to slots at fixed intervals so as not to encroach on communications occurring in adjacent slots. Additionally, the timing of the data transmission of the peripheral device may be adjusted to initially occur in the middle of a time slot, providing an interval before and after the data transmission within the slot, thus allowing adjustment for clock drift. As the correction offset stabilizes at a near zero value, the data transmission may be moved closer and closer to the beginning of its respective slot.

Thus, the present invention, according to various embodiments, allows lower power consumption to be achieved in a peripheral device while allowing a primary device to more efficiently control radio traffic with a plurality of devices including the peripheral device. The invention further enables a reduction in cost by allowing less expensive components such as lower tolerance crystals to be used. Conventional methods required making compromises among power consumption, network capacity and system cost. The present invention, according to its various embodiments, addresses all of these issues concurrently, hence alleviating the need to compromise.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A method for reducing power consumption in a wireless communication utilizing a slotted communication format, the method comprising:
   initiating a receiving interval by a primary device;
   receiving a data transmission from a peripheral device during the receiving interval, wherein the data transmission occurs in a middle of a time slot providing an interval before and after data transmission within the time slot to adjust for clock drift;
   determining, by the primary device, a correction offset according to a receive timing of the data transmission of the peripheral device, the correction offset determined so as to enable a subsequent data transmission by the peripheral device to occur within a subsequent receiving interval of the primary device;
   transmitting the correction offset by the primary device to the peripheral device: and
   reducing the subsequent receiving interval of the primary device according to the correction offset.

2. The method of claim 1, further comprising:
   receiving a second data transmission by the primary device from the peripheral device according to the correction offset.

3. The method of claim 1, wherein the correction offset is substantially equal to an interval between an expected receive time of the data transmission and an actual receive time of the data transmission.

4. The method of claim 1, wherein the wireless communication utilizes a standard format.

5. The method of claim 1, further comprising:
   adjusting a timing of the data transmission to allow the primary device to handle other traffic.

6. A system for reducing power consumption in wireless communications utilizing a slotted communication format, the system comprising:
   a primary device including a processor, a transmitter and a receiver, the processor configured to:
     initiate a receiving interval;
     receive using the receiver, a data transmission from a peripheral device during the receiving interval of the primary device, wherein the data transmission occurs in a middle of a time slot providing an interval before and after data transmission within the time slot to adjust for clock drift;
     determine a correction offset according to a receive timing of the data transmission of the peripheral device, the correction offset determined so as to enable a subsequent data transmission by the peripheral device to occur within a subsequent receiving interval of the primary device;

transmit, using the transmitter, the correction offset to the peripheral device; and reduce the subsequent receiving interval of the primary device according to the correction offset.

7. The system of claim 6, wherein the processor is further configured to receive, using the receiver, a second data transmission from the peripheral device according to the correction offset.

8. The system of claim 6, wherein the correction offset is substantially equal to an interval between an expected receive time of the data transmission and an actual receive time of the data transmission.

9. The system of claim 6, wherein the wireless communication utilizes a standard format.

10. The system of claim 6, wherein the processor is configured to adjust a timing of the data transmission to allow the primary device to handle other traffic.

11. An electronic device configured to operate utilizing a slotted communication format, the electronic device comprising:

circuitry configured to receive a data transmission from a peripheral device in a middle of a receiving time slot having an interval before and after data transmission within the receiving time slot to adjust for clock drift;

determine a correction offset according to a receive timing of the data transmission of the peripheral device;

transmit the correction offset to the peripheral device; and reduce a subsequent receiving time slot according to the correction offset.

12. The electronic device of claim 11, wherein the circuitry is configured to receive a second data transmission from the peripheral device according to the correction offset.

13. The electronic device of claim 11, wherein the correction offset is substantially equal to an interval between an expected receive time of the data transmission and an actual receive time of the data transmission.

14. The electronic device of claim 11, wherein the wireless communication utilizes a standard format.

15. The electronic device of claim 11, wherein the circuitry is configured to adjust a timing of the data transmission to allow the primary device to handle other traffic.

16. The electronic device of claim 11, wherein the electronic device is configured to communicate with a plurality of peripheral devices, and the circuitry is configured to control a transmission timing of each of the plurality of peripheral devices to not overlap in time.

17. The electronic device of claim 16, wherein the circuitry is configured to control communications with the peripheral device to be constrained to time slots at fixed intervals so as not to encroach on communications occurring in adjacent slots.

* * * * *